US008601121B2

(12) United States Patent
Kumar et al.

(10) Patent No.: US 8,601,121 B2
(45) Date of Patent: Dec. 3, 2013

(54) TRACKING CHANGES TO DATA WITHIN VARIOUS DATA REPOSITORIES

(75) Inventors: Ranjan Kumar, Morrisville, NC (US);
David L. Leigh, Chapel Hill, NC (US);
Eduardo A. Patrocinio, Cary, NC (US);
Renganathan Sundararaman, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 144 days.

(21) Appl. No.: 13/345,975

(22) Filed: Jan. 9, 2012

(65) Prior Publication Data

US 2013/0179560 A1    Jul. 11, 2013

(51) Int. Cl.
*G06F 15/16* (2006.01)

(52) U.S. Cl.
USPC .......................................... 709/224; 707/610

(58) Field of Classification Search
USPC ........... 709/224; 707/609, 610, 611, 625, 705
See application file for complete search history.

(56) References Cited

U.S. PATENT DOCUMENTS

| | | | |
|---|---|---|---|
| 7,617,254 B2* | 11/2009 | Loaiza et al. | 1/1 |
| 7,747,556 B2 | 6/2010 | MacLaurin | |
| 7,836,429 B2 | 11/2010 | Clemm et al. | |
| 7,890,469 B1 | 2/2011 | Maionchi et al. | |
| 7,933,866 B2 | 4/2011 | Blair et al. | |
| 7,991,740 B2 | 8/2011 | McCarthy et al. | |
| 8,489,548 B2* | 7/2013 | Wang et al. | 707/610 |
| 2002/0103818 A1* | 8/2002 | Amberden | 707/205 |
| 2004/0030954 A1* | 2/2004 | Loaiza et al. | 714/20 |
| 2005/0021571 A1 | 1/2005 | East | |
| 2006/0085412 A1 | 4/2006 | Johnson et al. | |
| 2007/0073674 A1 | 3/2007 | McVeigh et al. | |
| 2010/0005259 A1 | 1/2010 | Prahlad et al. | |
| 2010/0162204 A1 | 6/2010 | Baumann et al. | |
| 2010/0198783 A1* | 8/2010 | Wang et al. | 707/610 |
| 2011/0087632 A1 | 4/2011 | Subramanian et al. | |
| 2011/0107352 A1 | 5/2011 | Wells et al. | |
| 2011/0145216 A1 | 6/2011 | Subramanya | |
| 2012/0179653 A1* | 7/2012 | Araki et al. | 707/634 |

OTHER PUBLICATIONS

Khattak et al., "Change Tracer: Tracking Changes in Web Ontologies", ICTAI 21st IEEE International Conference on, Nov. 2-4, 2009, pp. 449-456.
Shi et al., "Study on Log-Based Change Data Capture and Handling Mechanism in Real-Time Data Warehouse", CSSE International Conference on , Dec. 12-14, 2008, pp. 478-481.

* cited by examiner

*Primary Examiner* — Moustafa M Meky
(74) *Attorney, Agent, or Firm* — Farrokh Pourmirzaie; Edell, Shaprio & Finnan, LLC

(57) ABSTRACT

A computer system retrieves from data repositories change information indicating changes to entries. Each data repository is associated with a corresponding interface and at least two data repositories are associated with different interfaces, and at least one data repository lacks tracking of changes to entries stored therein. The change information retrieved from the data repository is stored within a storage unit. The stored information includes identification of each repository entry change without storage of the changed entry. Requests are processed to provide change information for entries within the data repositories, wherein processing the change information request for one of the entries includes retrieving from the storage unit the identification of the repository entry change for the one of the entries. Embodiments of the present invention further include a method and computer program product for tracking changes within data repositories in substantially the same manner described above.

18 Claims, 4 Drawing Sheets

TRACKING CHANGES TO DATA WITHIN VARIOUS DATA REPOSITORIES

BACKGROUND

1. Technical Field

Embodiments of the present invention relate to data repositories, and more specifically, to tracking changes to data within heterogenous data repositories, and processing requests for data changes from consumers of those data repositories.

2. Discussion of the Related Art

Applications of enterprises accommodate data received from multiple data sources or repositories. A local copy of repository data is maintained by the applications in a local cache memory in order to provide faster response time or the ability to continue operating when the repository is unavailable. It is important for the applications to ensure that the local cache memory stores the latest and most recent data. For example, when an application has to make security related decisions, the application needs to utilize the latest or most recent data to ensure system integrity and security.

There are various factors that affect the ability of an application to maintain the most recent data. In particular, different applications need to cache different sets of data and, depending on the criticality of the data, applications may refresh the data at different frequencies. Further, data repositories may have different representations of the data, and the repository data can be modified by another application or by directly using a repository tool (e.g., Lightweight Directory Access Protocol (LDAP) browser). In addition, the ability to track changes to data may not be present in all data repositories being accessed. Accordingly, it may not be possible and practical for an application to query each data repository for changed data. This task becomes even more complicated since different data repositories may have different mechanisms to track the data changes or lack a change tracking mechanism.

BRIEF SUMMARY

According to one embodiment of the present invention, a system for tracking changes within data repositories comprises a computer system including at least one processor. The system retrieves change information from the data repositories indicating changes to entries within those repositories. Each data repository is associated with a corresponding interface and at least two data repositories are associated with different interfaces, and at least one data repository lacks tracking of changes to entries stored therein. The change information retrieved from the data repository for the repository entries is stored within a storage unit. The stored information includes identification of each repository entry change without storage of the changed entry in the storage unit. Requests are processed to provide change information for entries within the data repositories, wherein processing the change information request for one of the entries includes retrieving from the storage unit the identification of the repository entry change for the one of the entries. Embodiments of the present invention further include a method and computer program product for tracking changes within data repositories in substantially the same manner described above.

DETAILED DESCRIPTION

Present invention embodiments pertain to tracking changes to data within heterogenous data repositories, and processing requests for data changes from consumers of those data repositories. Present invention embodiments provide a consistent manner to track data changes within heterogenous data repositories and allow applications to retrieve change information pertaining to the data changes in a consistent format when a need for the changed data arises. The data changes may be tracked in various types of data repositories including those types that include and lack change tracking mechanisms. The data changes are tracked in a change log database that is populated based on change information from various data repositories pertaining to changes or modifications to data stored in those repositories.

Data in the change log database may be filtered and presented to a requesting application based on the needs of that application. The change log database tracks occurrence of data changes, and the types and times of the data changes (without duplicating the actual data stored in the data repositories). For present invention embodiments based on a pull (e.g., receivers request information, etc.) model (and not on a publish-subscribe model where receivers only receive information that is of interest), a requesting application may be inoperative and subsequently retrieve the changed data upon returning to an operational state.

Further, present invention embodiments provide a consistent manner for applications to retrieve changes to data from data repositories without including data structures in the applications themselves that would map the access for the applications to the internal details and data structure of the data repositories. An application is provided the flexibility to query for desired data changes when a need arises, and to control the quantity of data being searched and/or retrieved. In order to avoid receiving information pertaining to duplicate data changes or, in case an application becomes unavailable due to maintenance or an outage, the application may retrieve change information concerning changes to data of a data repository occurring within a specified time period. The time period may specify a particular duration to omit later occurring duplicate changes, or the time period may relate to the time when the application was unavailable, thereby enabling retrieval of changes occurring during the unavailability of the application. Moreover, an application may receive information concerning the granularity of the data change (e.g., if any of a set of data entities or objects has changed, if a specific data entity or object attribute has changed, the type of change (e.g., create, update, delete, rename, etc.), etc.). In addition, present invention embodiments provide a consistent Application Programming Interface (API) and data model to detect and retrieve change information concerning changed data from one or more data repositories.

Figure 1:
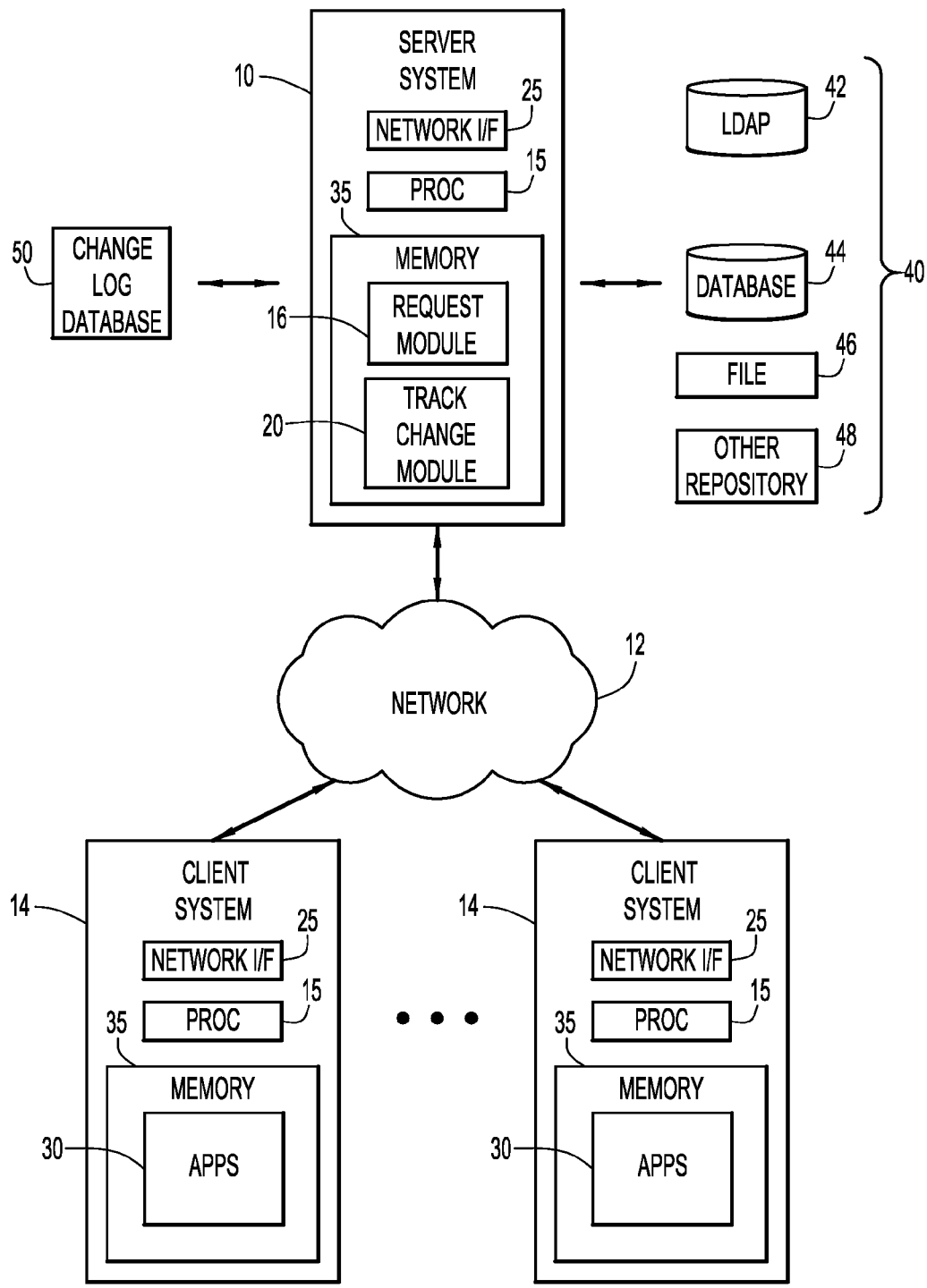
FIG. 1 is a diagrammatic illustration of an example computing environment for use with an embodiment of the present invention.
Figure 2:
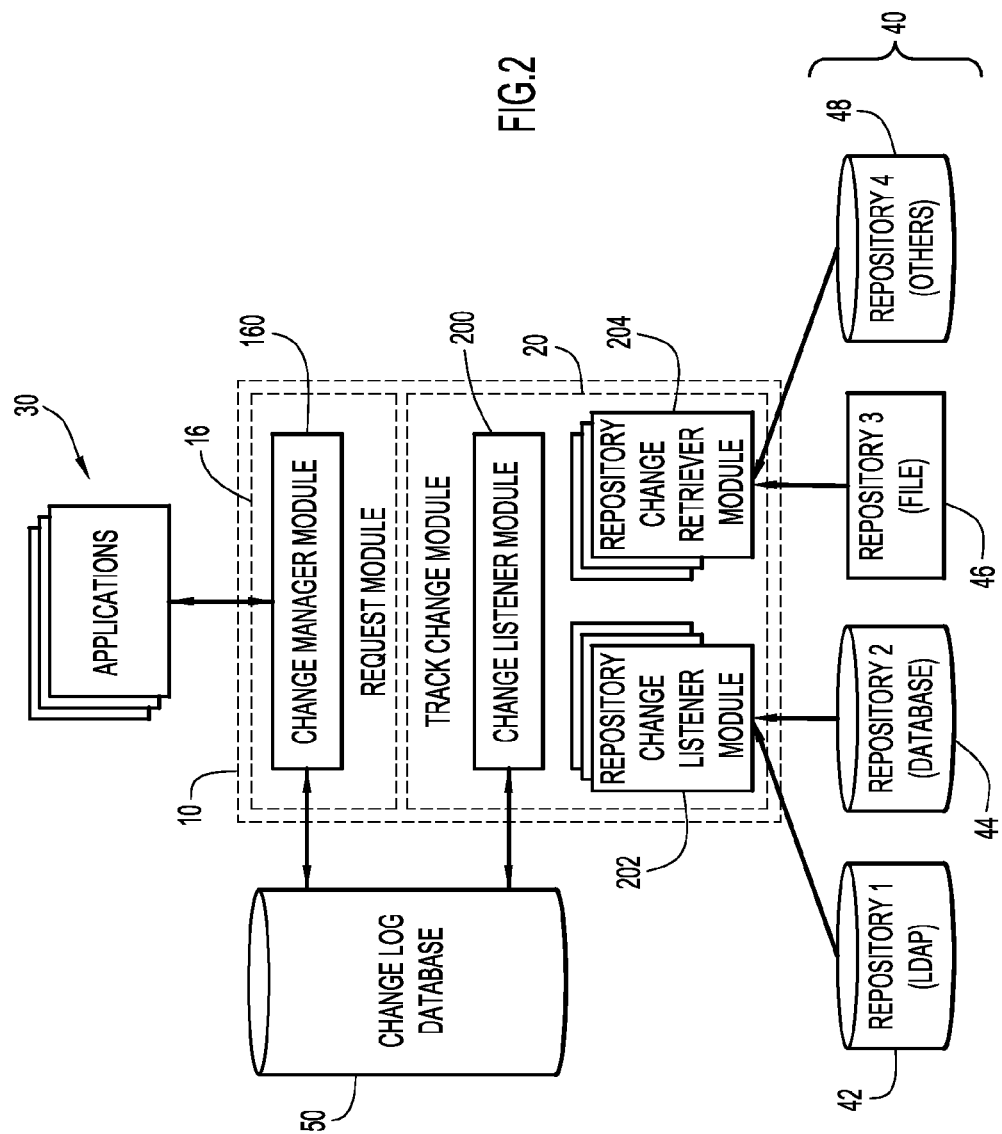
FIG. 2 is a block diagram of a request module and a track change module of the one or more server systems of FIG. 1 according to an embodiment of the present invention.

An example environment for use with present invention embodiments is illustrated in FIG. 1. Specifically, the environment includes one or more server systems 10 and one or more client or end-user systems 14. Server systems 10 and client systems 14 may be remote from each other and communicate over a network 12. The network may be implemented by any number of any suitable communications media (e.g., wide area network (WAN), local area network (LAN), Internet, Intranet, etc.). Alternatively, server systems 10 and client systems 14 may be local to each other and communicate via any appropriate local communication medium (e.g., local area network (LAN), hardwire, wireless link, Intranet, etc.).

Client systems 14 include one or more applications 30 and enable those applications to submit requests or queries to server systems 10 in order to ascertain change information pertaining to data changes within various data repositories 40. The server systems include a request module 16 to process requests or queries for change information pertaining to data changes within the data repositories and a track change module 20 to track or monitor changes to data within the data repositories. Data repositories 40 may include any quantity of any types of data repositories and may store any desired information. By way of example, data repositories 40 may include a Lightweight Directory Access Protocol (LDAP) repository 42, a database 44, a file 46, and/or other types of data repositories or storage units 48. The data repositories each typically store data in a corresponding (e.g., proprietary) data format, and include corresponding interfaces to communicate with data repository consumers. The stored data within data repositories 40 may include one or more of various data entries or items (e.g., database objects (e.g., tables, etc.), database object elements (e.g., rows, columns, etc.), fields, lines, words, records, characters/symbols, data objects or structures, etc.). A change log database 50 stores change information pertaining to data changes (e.g., changes to one or more data entries or items) within data repositories 40. The data repositories and change log database may be implemented by any conventional or other type of database or storage unit, may be local to or remote from server systems 10 and client systems 14, and may communicate via any appropriate communication medium (e.g., local area network (LAN), wide area network (WAN), Internet, hardwire, wireless link, Intranet, etc.).

The client systems may present a graphical user interface (GUI) or other interface (e.g., command line prompts, menu screens, etc.) to solicit requests or queries pertaining to the desired data change information, enable management and monitoring of the change information, and/or provide the change or other information to a user.

Server systems 10 and client systems 14 may be implemented by any conventional or other computer systems, which are preferably equipped with a display or monitor, a base (e.g., including at least one processor 15, one or more memories 35 and/or internal or external network interfaces or communications devices 25 (e.g., modem, network cards, etc.)), optional input devices (e.g., a keyboard, mouse or other input device), and any commercially available and custom software (e.g., server/communications software, request module, track change module, browser/interface software, etc.).

Request module 16 and track change module 20 may include one or more modules or units to perform the various functions of present invention embodiments described below. The various modules (e.g., request module, track change module, etc.) may be implemented by any combination of any quantity of software and/or hardware modules or units, and may reside within a corresponding memory 35 of one or more server systems 10 for execution by an associated processor 15. Similarly, various applications 30 may reside within memory 35 of client systems 114 for execution by a corresponding processor 15.

Track change module 20 includes a change listener module 200, one or more repository change listener modules 202, and one or more repository change retriever modules 204. Change listener module 200 collects change information pertaining to changes to one or more data entries or items from data repositories 40, and stores the change information in a normalized form in change log database 50. The change listener module provides the change information to the change log database in a normalized form to provide a common format for the change information for one or more requesting applications.

Data repositories 40 may store data in different manners and employ different mechanisms to track changes to the data stored therein. Accordingly, repository change listener modules 202 are each configured to interface a specific data repository 40 (or type of data repository) that includes a mechanism to track changes to data stored therein (e.g., includes the appropriate interface and processing compatible with the specific data repository or the specific type of data repository). In other words, each repository change listener module 202 may be configured to interface a corresponding data repository (e.g., a one-to one relationship), or interface one or more data repositories of the same type (e.g., a one-to-many relationship) and having common properties (e.g., common interface, common data format, etc.). Thus, the various data repositories (or various types of data repositories) may be associated with different interfaces or protocols for communication, where the repository change listener modules accommodate the different interfaces to communicate with the various data repositories. Each repository change listener module 202 is responsible to collect change information from one or more corresponding data repositories 40 pertaining to changes to one or more data entries or items, normalize the collected change information, and provide the collected change information in a normalized form to change listener module 200 for storage in change log database 50 (without storage of the actual data being changed).

The data repositories each preferably inform a corresponding change listener module 202 of a data change via a corresponding change tracking mechanism to facilitate retrieval and storage of the change information by the corresponding change listener module. By way of example, the change information for each changed data entry or item may include a change history of the data entry or item, a unique identification of a changed data entity or data object, an identification of the data repository storing the changed data, the type of change (e.g., adding, updating, deleting, etc.), and a timestamp of when the data change occurred. The normalization of the change information enables the one or more requesting applications to receive the change information in a common data format. The normalization may be performed via any conventional or other normalization techniques (e.g., common formats for timestamp, type of change, data entry and data repository identifications, etc.).

In addition, data repositories 40 may include one or more data repositories without a mechanism to track changes therein. Accordingly, repository change retriever modules 204 are each configured to interface a specific data repository 40 (or specific type of data repository) that lacks a mechanism to track changes to data stored therein (e.g., includes the appropriate interface and processing compatible with the specific data repository or specific type of data repository). In other words, each repository change retriever module may be configured to interface a corresponding data repository (e.g., a one-to one relationship), or interface one or more data repositories of the same type (e.g., a one-to-many relationship) and having common properties (e.g., common interface, common data format, etc.). Thus, the various data repositories (or various types of data repositories) may be associated with different interfaces or protocols for communication, where the repository change retriever modules accommodate the different interfaces to communicate with the various data repositories. Each repository change retriever module 204 is responsible to poll one or more corresponding data repositories 40 periodically to detect any changes to data entries or items stored therein and to collect change information for the detected changes.

The collected change information is normalized, and the change information is provided to change listener module 200 in a normalized form for storage in change log database 50. By way of example, the change information for each changed data entry or item may include a change history of the data entry or item, a unique identification of the changed data entity or data object, an identification of the data repository storing the changed data, the type of change (e.g., adding, updating, deleting, etc.), and a timestamp of when the data change occurred. The normalization of the change information enables the one or more requesting applications to receive the change information in a common data format as described above, and may be performed via any conventional or other normalization techniques (e.g., common formats for timestamp, type of change, data entry and data repository identifications, etc.).

The processes of track change module 20 and request module 16 collect change information pertaining to changes to one or more data entries or items from the data repositories and populate change log database 50 with the collected change information in a normalized form, and processing requests for the change information from one or more applications. These processes may be performed as a plurality of independent processes on a plurality of server systems 10, or may alternatively be combined into a single process performed on a corresponding server system 10.

Request module 16 includes a change manager module 160. The change manager module provides one or more Application Programming Interfaces (API) and a data model in order to retrieve change information from change log database 50 pertaining to changes to one or more data entries or items within data repositories 40 (e.g., Lightweight Directory Access Protocol (LDAP) repository 42, a database 44, a file 46, and other types of data repositories or storage units 48). The change manager module may employ any conventional or other data model for handling the change information and providing a common data format for applications 30.

The change manager module interfaces with one or more applications 30 to process requests for changed data within one or more data repositories 40, and enables the applications to track data changes and retrieve corresponding change information. Applications 30 may each monitor and retrieve data changes within data repositories 40 based on the same or different sets of criteria. That is, change manager module 160 processes requests from applications 30 and accesses change log database 50 to retrieve the desired change information pertaining to changes to one or more data entries or items within data repositories 40. The change log database stores the change information in a normalized form, and the type and time of the specific change (without storing a copy of the actual repository data being changed). By way of example, the change log database may store change information for each changed data entry or item including a change history of the data entry or item, a unique identification of a changed data entity or data object, an identification of the data repository storing the changed data, the type of change (e.g., adding, updating, deleting, etc.), and a timestamp of when the data change occurred.

Once a requesting application receives change information from change manager module 160 indicating that one or more data entries or items within data repositories 40 has changed, the application directly retrieves each actual changed data entry or item from the data repository storing the changed data using an appropriate repository Application Programming Interface (API) or another repository mechanism as described below.

In embodiments, the change manager module retrieves corresponding change information based on various criteria (e.g., all data changes, changes specific to a type of data entry (e.g., based on all users), changes specific to a data entry itself (e.g., based on a specific user, etc.), a history of changes, changes since a given time period or within a specific time frame, changes of a specific type (e.g., add, update, delete, etc.), changes to a specific data entity or data object, the most recent change related to a data entry, changes within a specific data repository, etc.).

Figure 3:
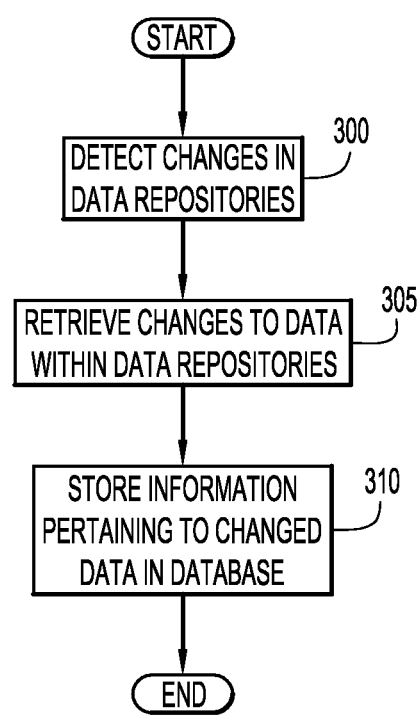
FIG. 3 is a procedural flow chart illustrating a manner to track data changes within various data repositories according to an embodiment of the present invention.

FIG. 3 illustrates a manner in which data changes within various data repositories are tracked (e.g., via track module 20 and server system 10), according to an embodiment of the present invention. Initially, data repositories 40 (FIG. 1) store and maintain various data, where the data within the data repositories may be modified in various manners (e.g., data may be added, updated or deleted by users, applications, etc.). Specifically, changes to one or more data entries or items within data repositories 40 are detected at step 300. In particular, repository change listener modules 202 interface data repositories 40 that include a change tracking mechanism to track changes to one or more data entries or items stored therein. When a change occurs within a data repository 40 including a change tracking mechanism, the data repository with the changed data notifies the corresponding repository change listener module 202 (for retrieval of change information pertaining to changes to one or more data entries or items from the data repository as described below).

Repository change retriever modules 204 interface data repositories 40 that lack a change tracking mechanism. In this case, each repository change retriever module 204 polls a corresponding data repository 40 to determine the presence of changes to one or more data entries or items. The data repository may be polled at any desired time intervals (e.g., minutes, seconds, hours, days, etc.).

Once data changes have been detected within data repositories 40, change information concerning changes to one or more data entries or items is retrieved from the data repositories with the changed data at step 305. This is accomplished by one or more of the repository change listener modules 202 and/or repository change retriever modules 204 retrieving the change information from the corresponding data repositories storing the changed data. These modules further normalize the change information and notify change listener module 200 of the changed data. The change listener module collects the change information in normalized form from the one or more repository change listener and repository change retriever modules 202, 204, and stores the collected change information in the change log database at step 310. The change information for each changed data entry or item may include a change history of the data entry or item, a unique identification of the changed data entity or data object, an identification of the data repository storing the changed data, the type of change (e.g., adding, updating, deleting, etc.), and a timestamp of when the data change occurred.

Figure 4:
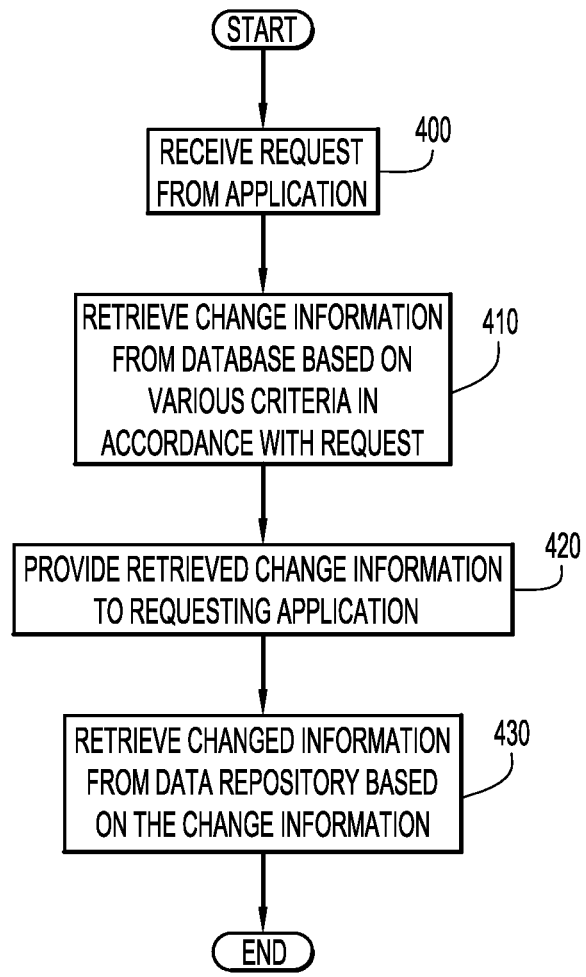
FIG. 4 is a procedural flow chart illustrating a manner to process requests for change information pertaining to changed data within various data repositories according to an embodiment of the present invention.

FIG. 4 illustrates a manner in which requests or queries for change information pertaining to data changes within the data repositories are processed (e.g., via request module 16 and server system 10), according to an embodiment of the present invention. Initially, change log database 50 is continuously updated with change information in normalized form in response to changes to one or more data entries or items within data repositories 40 as described above. An application 30 may need to maintain the most recent data (e.g., within a local cache memory, etc.) with respect to performing one or more tasks. Accordingly, a request for change information is received by change manager module 160 from application 30 of a client system 114 at step 400.

Change manager module 160 processes the request, and retrieves corresponding change information from the change log database at step 410 in accordance with various criteria. The request may indicate the various criteria with which to search for change information within the change log database (e.g., all data changes, specific to a type of data entry (e.g., based on all users), specific to a data entry itself (e.g., based on a specific user, etc.), a history of changes, changes since a given time period or within a specific time frame, changes of a specific type (e.g., adding, updating, deleting, etc.), changes to a specific data entity or data object, the most recent change related to an entry, changes within a specific data repository, etc.). These criteria may be compared to corresponding data of the change information stored in the change log database during a search to identify desired information (e.g., a specific time frame criterion may be compared with a timestamp within the change information, specific data repository or data object criteria may be compared with identifications within the stored change information, etc.).

Once the desired change information is retrieved from the change log database, the retrieved information is provided to requesting application 30 at step 420. The requesting application receives the change information in normalized form as described above, and preferably utilizes a common Application Programming Interface (API) to ascertain the change information from change manager module 160. The common Application Programming Interface (API) enables requesting application 30 to retrieve the change information without understanding the various Application Programming Interfaces (API) and data formats of the various data repositories.

The change information provided to requesting application 30 by change manager module 160 indicates one or more changed data entries or items, and the operations applied to those data entries or items within the data repositories (but does not contain the actual data entries or items from the data repositories). Accordingly, the requesting application utilizes the change information associated with the changed data entries or items (e.g., identification of a data repository, identification of a data entity or data object, etc.) to directly retrieve each changed data entry or item from a corresponding data repository 40 at step 430. In this manner, one or more applications 30 may each poll the change manager module to determine the presence of changed data within data repositories 40, and subsequently retrieve the changed data directly from those data repositories (e.g., without retrieving unchanged data). The polling may be accomplished at any desired time intervals (e.g., minutes, hours, days, etc.) sufficient for a task. This enables the requesting application to maintain the most recent data from data repositories 40. Authorization or verification of the changed data from the data repositories may be provided by the change manager module, or when the requesting application invokes the Application Programming Interfaces (API) of the data repositories to retrieve the actual data.

It will be appreciated that the embodiments described above and illustrated in the drawings represent only a few of the many ways of implementing embodiments for tracking changes to data within various data repositories.

The environment of the present invention embodiments may include any number of computer or other processing systems (e.g., client or end-user systems, server systems, etc.) and databases or other repositories arranged in any desired fashion, where the present invention embodiments may be applied to any desired type of computing environment (e.g., cloud computing, client-server, network computing, mainframe, stand-alone systems, etc.). The computer or other processing systems employed by the present invention embodiments may be implemented by any number of any personal or other type of computer or processing system (e.g., IBM-compatible, laptop, PDA, mobile devices, etc.), and may include any commercially available operating system and any combination of commercially available and custom software (e.g., browser software, communications software, server software, request module, track change module, change manager module, change listener module, repository change listener module, repository change retriever module, etc.). These systems may include any types of monitors and input devices (e.g., keyboard, mouse, voice recognition, etc.) to enter and/or view information.

It is to be understood that the software (e.g., request module, track change module, change manager module, change listener module, repository change listener module, repository change retriever module, etc.) of the present invention embodiments may be implemented in any desired computer language and could be developed by one of ordinary skill in the computer arts based on the functional descriptions contained in the specification and flow charts illustrated in the drawings. Further, any references herein of software performing various functions generally refer to computer systems or processors performing those functions under software control. The computer systems of the present invention embodiments may alternatively be implemented by any type of hardware and/or other processing circuitry.

The various functions of the computer or other processing systems may be distributed in any manner among any number of software and/or hardware modules or units, processing or computer systems and/or circuitry, where the computer or processing systems may be disposed locally or remotely of each other and communicate via any suitable communications medium (e.g., LAN, WAN, Intranet, Internet, hardwire, modem connection, wireless, etc.). For example, the functions of the present invention embodiments may be distributed in any manner among the various end-user/client and server systems, and/or any other intermediary processing devices. The software and/or algorithms described above and illustrated in the flow charts may be modified in any manner that accomplishes the functions described herein. In addition, the functions in the flow charts or description may be performed in any order that accomplishes a desired operation.

The software of the present invention embodiments (e.g., request module, track change module, change manager module, change listener module, repository change listener module, repository change retriever module, etc.) may be available on a recordable or computer useable medium (e.g., magnetic or optical mediums, magneto-optic mediums, floppy diskettes, CD-ROM, DVD, memory devices, etc.) for use on stand-alone systems or systems connected by a network or other communications medium.

The communication network may be implemented by any number of any type of communications network (e.g., LAN, WAN, Internet, Intranet, VPN, etc.). The computer or other processing systems of the present invention embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., local area network (LAN), hardwire, wireless link, Intranet, etc.).

The system may employ, and the data repositories and change log database may include, any number of any conventional or other databases, data stores, data repositories, or storage structures (e.g., files, databases, data structures, data or other repositories, etc.) to store any desired information. The data repositories may include any desired interfaces or data formats, where the same or different interfaces and data formats may be employed by the individual data repositories. In other words, the data repositories may include heterogenous or homogenous repositories. The data repositories and change log database may each be implemented by any number of any conventional or other databases, data stores, data repositories, or storage structures (e.g., files, databases, data structures, data or other repositories, etc.) to store any desired information.

The change log database is preferably utilized as a central database or storage unit to store change information for each of the data repositories. However, any quantity of change log databases may be employed with each change log database storing change information for one or more of the data repositories. The data repositories and change log database may each be included within or coupled to the server and/or client systems. The data repositories and change log database may be remote from or local to the computer or other processing systems, and may store any desired data. Further, each data entry or item within the data repositories may include any quantity of data stored in any desired storage element (e.g., files, arrays, lists, stacks, queues, database objects (e.g., tables, etc.), database object elements (e.g., rows, columns, etc.), fields, lines, words, records, characters/symbols, data objects or structures, etc.).

The change information may include any desired information pertaining to a change to any data element or portion thereof (e.g., repository identification, data element identification, time of occurrence of the change, type of change, etc.). The change information may be stored without normalization, or may be normalized via any conventional or other techniques to any desired data format. The change information may be searched or queried based on any desired criteria (e.g., time frame, type of change, repository, etc.). In addition, the change information may include any portion or the entirety of the original or actual changed data within the data repository.

A repository change listener module may be associated with any quantity of data repositories (e.g., for a one-to-one or many-to-one relationship). The change tracking mechanisms of the data repositories may inform corresponding repository change listener modules of data changes upon occurrence of a change, or at any desired time intervals (e.g., seconds, minutes, hours, days, etc.). Alternatively, the repository change listener modules may poll the change tracking mechanism of each associated data repository at any desired time interval (e.g., seconds, minutes, hours, days, etc.). The data repositories may indicate data changes to, or be polled by, the repository change listener modules at the same or different time intervals.

Similarly, a repository change retriever module may be associated with any quantity of data repositories (e.g., for a one-to-one or many-to-one relationship). The repository change retriever module may poll each associated data repository at any desired time interval (e.g., seconds, minutes, hours, days, etc.). The data repositories may be polled by repository change retriever modules at the same or different time intervals.

The change information may be requested by and provided to any suitable entity (e.g., user, application, script, hardware device, user or other interface, etc.). The change information provided may be filtered based on any desired criteria (e.g., instead of, or in addition to, the search criteria for the change log database). In addition, a requesting application may retrieve all or any portion of the quantity of changed data entries or items indicated in the change information. For example, the change information may be filtered based on the severity of the change or the significance of data being changed (e.g., a change to an insignificant field of a data object may not be of interest and filtered, a small or minute portion of a data object being changed may not warrant the cost of retrieving the changed data from the data repository, etc.). In addition, all or any portion of a data object containing the changed data, or all or any portion of the changed data itself may be retrieved from the data repository. The applications may poll or request change information at any desired (same or different) time intervals (e.g., seconds, minutes, hours, days, etc.). The requests and change detection may occur synchronously or asynchronously and in a serial and/or parallel fashion.

The present invention embodiments may employ any number of any type of user interface (e.g., Graphical User Interface (GUI), command-line, prompt, etc.) for obtaining or providing information (e.g., search queries or criteria, etc.), where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

The present invention embodiments are not limited to the specific tasks or algorithms described above, but may be utilized for tracking changes within any collection of data.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises", "comprising", "includes", "including", "has", "have", "having", "with" and the like, when used in this specification, specify the presence of stated features, integers, steps, operations, elements, and/or components, but do not preclude the presence or addition of one or more other features, integers, steps, operations, elements, components, and/or groups thereof. Moreover, the terminology "retrieving change information from a data repository" includes not only reading a stored change entry indication from a data repository that tracks changes (and, accordingly, stores indications thereof), but also includes obtaining change information via monitoring a data repository in an instance where the data repository does not track changes, such as via polling the data repository or detecting transactions therein.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A computer-implemented method of tracking changes within data repositories comprising:
   retrieving change information from the data repositories indicating changes to entries within those repositories, wherein each data repository is associated with a corresponding interface and at least two data repositories are associated with different interfaces, and wherein at least one data repository lacks tracking of changes to entries stored therein;

storing, within a storage unit, the change information retrieved from the data repository for the repository entries, wherein the storing includes storing identification of each repository entry change without storage of the changed entry in the storage unit; and processing requests to provide change information for entries within the data repositories, wherein processing the change information request for one of the entries includes retrieving from the storage unit the identification of the repository entry change for the one of the entries.

2. The computer-implemented method of claim 1, wherein at least one data repository tracks changes to entries stored therein.

3. The computer-implemented method of claim 1, wherein retrieving change information includes:

polling the at least one data repository that lacks tracking, wherein the polling detects changes to the entries stored therein.

4. The computer-implemented method of claim 1, further including:

retrieving one or more changed entries from the data repositories based on the provided change information.

5. The computer-implemented method of claim 1, wherein the requests for stored information include requests for at least one of all changes, changes specific to a type of entry, changes specific to an entry, a history of changes, changes since a given time period, changes of a specific type, and a last change related to an entry.

6. The computer-implemented method of claim 1, wherein the requests for stored information originate from a plurality of applications, and wherein at least two of the applications retrieve changes based on a different set of criteria.

7. A system for tracking changes within data repositories comprising:

a computer system including at least one processor configured to:

retrieve change information from the data repositories indicating changes to entries within those repositories, wherein each data repository is associated with a corresponding interface and at least two data repositories are associated with different interfaces, and wherein at least one data repository lacks tracking of changes to entries stored therein;

store, within a storage unit, the change information retrieved from the data repository for the repository entries, wherein the storing includes storing identification of each repository entry change without storage of the changed entry in the storage unit; and process requests to provide change information for entries within the data repositories, wherein processing the change information request for one of the entries includes retrieving from the storage unit the identification of the repository entry change for the one of the entries.

8. The system of claim 7, wherein at least one data repository tracks changes to entries stored therein.

9. The system of claim 7, wherein retrieving change information includes:

polling the at least one data repository that lacks tracking, wherein the polling detects changes to the entries stored therein.

10. The system of claim 7, wherein the at least one processor is further configured to:

retrieve one or more changed entries from the data repositories based on the provided change information.

11. The system of claim 7, wherein the requests for stored information include requests for at least one of all changes, changes specific to a type of entry, changes specific to an entry, a history of changes, changes since a given time period, changes of a specific type, and a last change related to an entry.

12. The system of claim 7, wherein the requests for stored information originate from a plurality of applications, and wherein at least two of the applications retrieve changes based on a different set of criteria.

13. A computer program product for tracking changes within data repositories comprising:

a computer readable storage medium having computer readable program code embodied therewith, the computer readable program code comprising computer readable program code configured to:

retrieve change information from the data repositories indicating changes to entries within those repositories, wherein each data repository is associated with a corresponding interface and at least two data repositories are associated with different interfaces, and wherein at least one data repository lacks tracking of changes to entries stored therein;

store, within a storage unit, the change information retrieved from the data repository for the repository entries, wherein the storing includes storing identification of each repository entry change without storage of the changed entry in the storage unit; and process requests to provide change information for entries within the data repositories, wherein processing the change information request for one of the entries includes retrieving from the storage unit the identification of the repository entry change for the one of the entries.

14. The computer program product of claim 13, wherein at least one data repository tracks changes to entries stored therein.

15. The computer program product of claim 13, wherein retrieving change information includes:

polling the at least one data repository that lacks tracking, wherein the polling detects changes to the entries stored therein.

16. The computer program product of claim 13, wherein the computer readable program code further comprises computer readable program code configured to:

retrieve one or more changed entries from the data repositories based on the provided change information.

17. The computer program product of claim 13, wherein the requests for stored information include requests for at least one of all changes, changes specific to a type of entry, changes specific to an entry, a history of changes, changes since a given time period, changes of a specific type, and a last change related to an entry.

18. The computer program product of claim 13, wherein the requests for stored information originate from a plurality of applications, and wherein at least two of the applications retrieve changes based on a different set of criteria.

* * * * *